US007470745B2

(12) United States Patent
Peng et al.

(10) Patent No.: US 7,470,745 B2
(45) Date of Patent: Dec. 30, 2008

(54) PERFLUOROETHER BASED POLYMERS

(75) Inventors: Sheng Peng, Wilmington, DE (US);
Stephen James Getty, Wilmington, DE (US); Timothy Edward Hopkins, Wilmington, DE (US); Ying Wang, W. Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 25 days.

(21) Appl. No.: 11/598,333

(22) Filed: Nov. 13, 2006

(65) Prior Publication Data

US 2008/0113199 A1    May 15, 2008

(51) Int. Cl.
*C08K 3/00* (2006.01)
(52) U.S. Cl. .............. 524/589; 427/372.2; 428/423.1; 526/242; 526/243; 526/248; 528/30
(58) Field of Classification Search ............... 524/589; 526/242, 243, 248; 427/372.2; 428/423.1; 528/30
See application file for complete search history.

(56) References Cited

U.S. PATENT DOCUMENTS

| | | | |
|---|---|---|---|
| 3,564,059 A | 2/1971 | Slanesl et al. | |
| 4,504,401 A | 3/1985 | Matsuo et al. | |
| 4,960,543 A | 10/1990 | Wehowsky et al. | |
| 5,189,135 A | 2/1993 | Cozzi et al. | |
| 5,411,766 A * | 5/1995 | Kirchner | 427/393.4 |
| 5,481,027 A | 1/1996 | Kirchner | |
| 5,481,028 A * | 1/1996 | Petrov et al. | 560/184 |
| 5,491,261 A | 2/1996 | Haniff et al. | |
| 5,509,939 A | 4/1996 | Kirchner | |
| 5,580,645 A | 12/1996 | Kirchner | |
| 6,040,414 A | 3/2000 | Temtchenko et al. | |
| 6,071,564 A | 6/2000 | Marchetti et al. | |
| 6,479,612 B1 * | 11/2002 | Del Pesco et al. | 528/70 |
| 6,608,138 B2 | 8/2003 | Carignano et al. | |
| 6,756,468 B2 | 6/2004 | Turri et al. | |
| 2003/0136938 A1 * | 7/2003 | Clark et al. | 252/8.62 |
| 2003/0149218 A1 * | 8/2003 | Cote' et al. | 528/77 |
| 2004/0077237 A1 | 4/2004 | Audenaert et al. | |
| 2004/0077238 A1 | 4/2004 | Audenaert et al. | |
| 2005/0164010 A1 | 7/2005 | Trombetta | |
| 2005/0171279 A1 | 8/2005 | Cote et al. | |

FOREIGN PATENT DOCUMENTS

| | | |
|---|---|---|
| DE | 2821495 | 5/1978 |
| EP | 0 435 641 B1 | 12/1990 |
| EP | 435 641 B1 * | 4/1997 |
| EP | 0 695 772 B1 | 12/1999 |
| JP | 1998045850 A | 2/1998 |
| JP | 2003062058 A | 3/2003 |
| WO | WO-95/11877 * | 5/1995 |
| WO | WO 2006046643 A1 | 5/2006 |

OTHER PUBLICATIONS

Temtchenko, New Fluorinated Protective Coatings; Pitture e Vernici, European Coatings (2001), 77(10), 15-20; G.B.P. Communications, Milan, Italy.

* cited by examiner

*Primary Examiner*—Peter D. Mulcahy
*Assistant Examiner*—Henry Hu
(74) *Attorney, Agent, or Firm*—Nancy S. Mayer

(57) ABSTRACT

A composition which provides surface effects to substrates comprising a polymer containing at least one urea linkage prepared by
(i) reacting (1) at least one organic diioscyanate, polyisocyanate, or mixture thereof, and (2) at least one fluorochemical compound of Formula I $$R_f-O(CF_2CF_2)_r(CH_2CH_2)_q(R^1)_sXH \quad \text{Formula (I)}$$

wherein
$R_f$ is a linear or branched $C_1$ to $C_7$ perfluoroalkyl optionally interrupted by one to three oxygen atoms,
r is 1 to 3, q is 1 to 3, s is 0 or 1,
X is O, S, or $NR^2$ wherein $R^2$ is H, or $C_1$ to $C_6$ alkyl, and
$R^1$ is a divalent radical selected from —$S(CH_2)_n$—, $$-(OCH_2CH)_p^{R^3}-, \quad -(OCH_2CH)_p^{CH_2Cl}- \text{ or}$$

$$-\overset{R^4}{\underset{R^5}{C}}-(OCH_2CH)_p^{CH_2Cl}-;$$

p is 1 to 50, and $R^3$, $R^4$ and $R^5$ are each independently H or $C_1$ to $C_6$ alkyl;
(ii) and then reacting with (3) water, a linking agent, or a mixture thereof.

11 Claims, No Drawings

PERFLUOROETHER BASED POLYMERS

FIELD OF THE INVENTION

This invention relates to the field of polyfluorinated compounds containing an ether linkage within the polyfluorinated chain, and particularly to such polyurethane fluoropolymers useful to provide surface properties to substrates treated therewith.

BACKGROUND OF THE INVENTION

Various polymers made from perfluorinated compositions are known to be useful as treating agents to provide surface effects to substrates. Surface effects include repellency to moisture, soil, and stains, and other effects, which are particularly useful for fibrous substrates and other substrates such as hard surfaces. Many such treating agents are fluorinated polymers or copolymers.

Most commercially available fluorinated polymers useful as treating agents for imparting surface effects to substrates contain predominantly eight or more carbons in the perfluoroalkyl chain to provide the desired properties. Honda et al, in Macromolecules, 2005, 38, 5699-5705 teach that for perfluoroalkyl chains of greater than 8 carbons, orientation of the perfluoroalkyl groups, designated $R_f$ groups, is maintained in a parallel configuration while for such chains having less than 6 carbons, reorientation occurs. This reorientation decreases surface properties such as contact angle. Thus shorter chain perfluoroalkyls have traditionally not been successful commercially for imparting surface effects to substrates.

It is desired to improve particular surface effects and to increase the fluorine efficiency; i.e., boost the efficiency or performance of treating agents so that lesser amounts of the expensive fluorinated polymer are required to achieve the same level of performance, or so that better performance is achieved using the same level of fluorine. It is desirable to reduce the chain length of the perfluoroalkyl groups thereby reducing the amount of fluorine present, while still achieving the same or superior surface effects.

U.S. Pat. No. 3,564,059 discloses perfluorinated ethers and polyethers useful as plasticizers and solvents. No utility in providing repellency surface effects to substrates is disclosed.

There is a need for polymer compositions which significantly improve the repellency and stain resistance of fluorinated polymer treating agents for fibrous substrates and hard surface substrates while using lower levels of fluorine. The present invention provides such compositions.

SUMMARY OF THE INVENTION

The present invention comprises a composition comprising a polymer containing at least one urea linkage prepared by
  (i) reacting (1) at least one organic diioscyanate, polyisocyanate, or mixture thereof, and (2) at least one fluorochemical compound of Formula I $$R_f\text{—O}(CF_2CF_2)_r(CH_2CH_2)_q(R^1)_s XH \quad \text{Formula I}$$

wherein
  $R_f$ is a linear or branched $C_1$ to $C_7$ perfluoroalkyl optionally interrupted by one to three oxygen atoms,
  r is 1 to 3, q is 1 to 3, s is 0 or 1,
  X is O, S, or NR wherein $NR^2$ is H, or $C_1$ to $C_6$ alkyl, and
  $R^1$ is the divalent radical —S(CH$_2$)$_n$—,

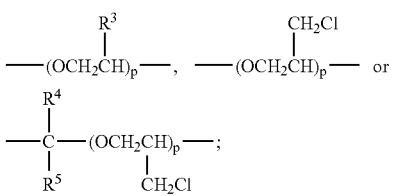

n is 2 to 4, p is 1 to 50, and $R^3$, $R^4$ and $R^5$ are each independently H or $C_1$ to $C_6$ alkyl;
  (ii) and then reacting with (3) water, a linking agent, or a mixture thereof.

The present invention further comprises a method of providing water repellency, oil repellency, stain release, hydrophilicity stain release, and cleanability to a substrate comprising contacting said substrate with the above polymer.

The present invention further comprises a method of providing soil resistance to a substrate comprising contacting said substrate with the above polymer wherein the diisocyanate, polyisocyanate, or mixture thereof comprises one or more cyclic diisocyanates selected from the group consisting of 2,4-toluene diisocyanate; 2,6-toluene diisocyanate; diphenylmethane 4,4'-diisocyanate; diphenylmethane 2,4'-diisocyanate; 3-isocyanatomethyl-3,4,4-trimethylcyclohexyl isocyanate; and bis-(4-isocyanatocylohexyl)methane and diisocyanate trimers of formula (IIa), (IIb):

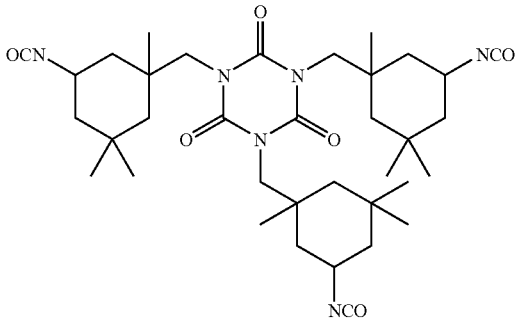

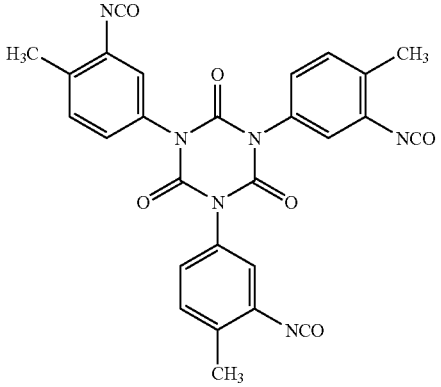

The present invention further comprises a substrate to which has been applied the above polymer.

DETAILED DESCRIPTION OF THE INVENTION

Hereinafter trademarks are shown in upper case.

This invention provides polymers as described above, which are prepared from fluoroalcohols, fluorothiols, or fluoroamines containing a perfluoroalkyl ether. These compositions are useful for contributing stain-release, oil repellency, water repellency, hydrophilicity stain release, cleanability and soil resistance to fibrous and hard substrates, and for other uses where a perfluorinated end group provides special surface-modifying properties. The perfluoroalkyl group in the polymers of the present invention contains 1 to 7 carbon atoms, and typically exhibit surface properties equal to or greater than conventional commercial surface treatment agents that typically contain a perfluoroalkyl group having 8 to about 20 carbon atoms.

The fluoroalcohols used to make the compositions of the present invention are available by the following series of reactions:

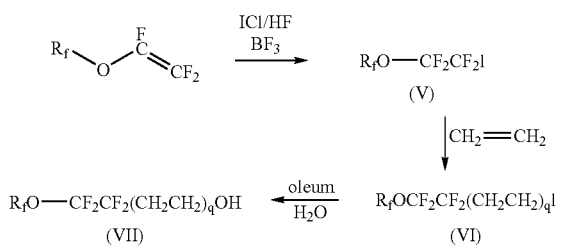

The starting perfluoroalkyl ether iodides are made by the procedure described in U.S. Pat. No. 5,481,028, herein incorporated by reference, in Example 8, which discloses the preparation of compounds of formula (V) from perfluoro-n-propyl vinyl ether.

In the second reaction above, a perfluoalkyl ether iodide (V) is reacted with an excess of ethylene at an elevated temperature and pressure. While the addition of ethylene can be carried out thermally, the use of a suitable catalyst is preferred. Preferably the catalyst is a peroxide catalyst such as benzoyl peroxide, isobutyryl peroxide, propionyl peroxide, or acetyl peroxide. More preferably the peroxide catalyst is benzoyl peroxide. The temperature of the reaction is not limited, but a temperature in the range of 110° C. to 130° C. is preferred. The reaction time varies with the catalyst and reaction conditions, but 24 hours is typically adequate. The product can be purified by any means that separates unreacted starting material from the final product, but distillation is preferred. Satisfactory yields up to 80% of theory have been obtained using about 2.7 mols of ethylene per mole of perfluoalkyl ether iodide, a temperature of 110° C. and autogenous pressure, a reaction time of 24 hours, and purifying the product by distillation.

The perfluoroalkylether ethylene iodides (VI) are treated with oleum and hydrolyzed to provide the corresponding alcohols (VII) according to procedures disclosed in WO 95/11877. Alternatively, the perfluoroalkylether ethyl iodides are treated with N-methyl formamide followed by ethyl alcohol/acid hydrolysis. A temperature of about 130° to 160° C. is preferred. The higher homologs (q=2, 3) of telomer ethylene iodides (VI) are available with excess ethylene at high pressure.

The telomer ethylene iodides (VI) can be treated with a variety of reagents to provide the corresponding thiols according to procedures described in J. Fluorine Chemistry, 104, 2 173-183 (2000). One example is the reaction of the telomer ethylene iodides (VI) with sodium thioacetate, followed by hydrolysis.

The telomer ethylene iodides (VI) are treated with omega-mercapto-1-alkanols according the following scheme to provide compounds of formula (VIII):

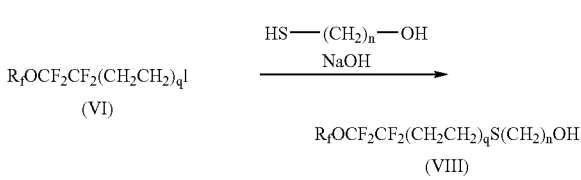

The telomer ethylene iodides (VI) are treated with omega-mercapto-1-alkylamines according the following scheme to provide compounds of formula (IX):

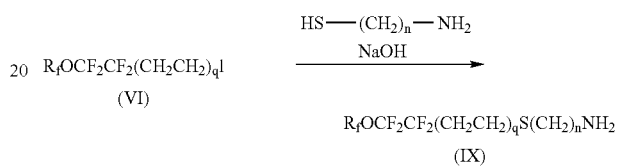

Preferred compounds of formula (VIII) and (IX) for practicing the invention are wherein q=1 and n=2 to 3.

Specific fluoroether alcohols useful in forming polymers of the invention include those listed in Table 1A. The perfluoroalkyl groups of the listed alcohols are linear unless specifically indicated otherwise.

TABLE 1A

| | |
|---|---|
| 1 | $F_3COCF_2CF_2CH_2CH_2OH$, |
| 2 | $F_3CO(CF_2CF_2)_2CH_2CH_2OH$, |
| 3 | $C_2F_5OCF_2CF_2CH_2CH_2OH$, |
| 4 | $C_2F_5O(CF_2CF_2)_2CH_2CH_2OH$, |
| 5 | $C_3F_7OCF_2CF_2CH_2CH_2OH$, |
| 6 | $C_3F_7O(CF_2CF_2)_2CH_2CH_2OH$, |
| 7 | $C_4F_9OCF_2CF_2CH_2CH_2OH$, |
| 8 | $C_4F_9O(CF_2CF_2)_2CH_2CH_2OH$, |
| 9 | $C_6F_{13}OCF_2CF_2CH_2CH_2OH$, |
| 10 | $C_6F_{13}O(CF_2CF_2)_2CH_2CH_2OH$, |
| 11 | $F_3COCF(CF_3)CF_2OCF_2CF_2CH_2CH_2OH$, |
| 12 | $F_3COCF(CF_3)CF_2O(CF_2CF_2)_2CH_2CH_2OH$, |
| 13 | $C_2F_5OCF(CF_3)CF_2OCF_2CF_2CH_2CH_2OH$, |
| 14 | $C_2F_5OCF(CF_3)CF_2O(CF_2CF_2)_2CH_2CH_2OH$, |
| 15 | $C_3F_7OCF(CF_3)CF_2OCF_2CF_2CH_2CH_2OH$, |
| 16 | $C_3F_7OCF_3CF_2O(CF_2CF_2)_2CH_2CH_2OH$. |

To make the fluoropolymers of the present invention, the perfluoroalkylether ethyl alcohol, or corresponding thiol or amine, is reacted with a polyisocyanate. The polyisocyanate reactant adds to the branched nature of the polymer. By the term "polyisocyanate" is meant di- and higher isocyanates and the term includes oligomers. Any polyisocyanate having predominately two or more isocyanate groups, or any isocyanate precursor of a polyisocyanate having predominately two or more isocyanate groups, is suitable for use in this invention. For example, hexamethylene diisocyanate homopolymers are suitable for use herein and are commercially available. It is recognized that polymer formed from minor amounts of diisocyanates may remain in products made from multiple isocyanate groups. An example of this is a biuret containing residual small amounts of hexamethylene diisocyanate.

Also suitable for use as the polyisocyanate reactant are hydrocarbon diisocyanate-derived isocyanurate trimers. Preferred is DESMODUR N-3300 (a hexamethylene diisocyanate-based isocyanurate also available from Bayer Corporation, Pittsburgh Pa.). Other triisocyanates useful for the purposes of this invention are those obtained by reacting three moles of toluene diisocyanate with 1,1,1-tris-(hydroxymethyl)ethane or 1,1,1-tris-(hydroxymethyl)propane. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3600, DESMODUR Z-4470, and DESMODUR XP 2410, from Bayer Corporation, Pittsburgh, Pa., and bis-(4-isocyanatocylohexyl)methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents. Particularly preferred as the polyisocyanate reactant are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corp) and diisocyanate trimers of formulas (IIa) and (IIb), available as DESMODUR Z2447 and DESMODUR N-3300, respectively, from Bayer Corporation

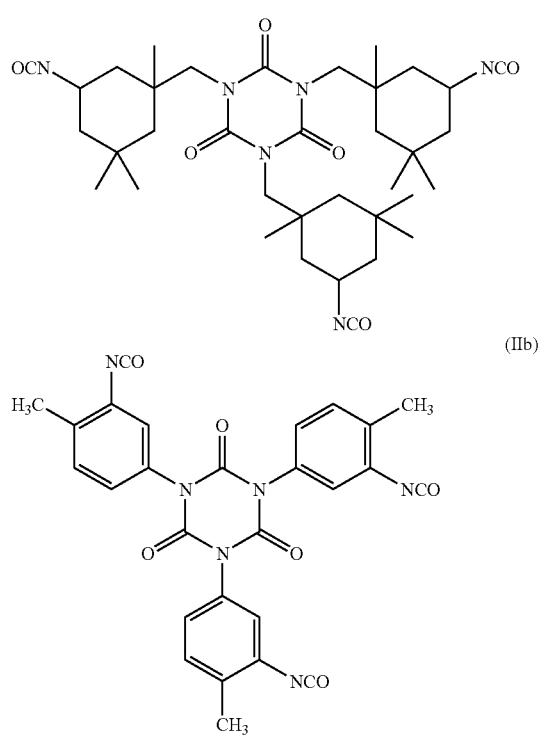

fluorothiol, fluoroamine, or a mixture thereof; and optionally a non-fluorinated organic compound. The order of reagent addition is not critical. The specific weight of the polyisocyanate and other reactants charged is based on their equivalent weights and on the working capacity of the reaction vessel, and is adjusted so that alcohol, thiol, or amine will be consumed in the first step. The charge is agitated and temperature adjusted to about 40° C.-70° C. Typically a catalyst such as a titanium chelate in an organic solvent is then added and the temperature is raised to about 80° C.-100° C. After holding for several hours, additional solvent and water, linking agent, or a combination thereof, is added and the mixture is allowed to react for several more hours or until all of the isocyanate has been reacted. More water can then be added along with surfactants, if desired, and stirred until thoroughly mixed. Following homogenization, the organic solvent can be removed by evaporation at reduced pressure, and the remaining aqueous solution of the fluoropolymer used as is or subjected to further processing.

A preferred embodiment of the invention is a composition wherein $R_f$ is a linear $C_1$ to $C_3$ perfluoroalkyl group, and more preferably wherein r is 1, q is 1 and s is 0. Other preferred embodiments are polymers wherein said fluorinated compound reacts with about 5 mol % to about 90 mol %, and more preferably about 10 mol % to about 70 mol %, of said isocyanate groups. Other preferred embodiments are polymers wherein the linking group is a diamine or polyamine.

In an additional preferred embodiment, step (i) reacting, further comprises (d) a non-fluorinated organic compound that contains a single functional group selected from the group of formula $$R^{10}—(R^{11})_k—YH$$

wherein
$R^{10}$ is a $C_1$-$C_{18}$ alkyl, a $C_1$-$C_{18}$ omega-alkenyl radical or a $C_1$-$C_{18}$ omega-alkenoyl;
$R^{11}$ is

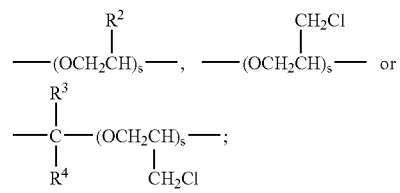

in which $R^2$, $R^3$ and $R^4$ are, independently, H or $C_1$ to $C_6$ alkyl, and s is 1 to 50;
k is 0 or 1; and
Y is —O—, —S—, or —N($R^5$)— in which $R^5$ is H or alkyl containing 1 to 6 carbon atoms. Preferably the non-fluorinated compound of formula $R^{10}—(R^{11})_k—YH$ reacts with about 0.1 mol % to about 60 mol % of said isocyanate groups.

In another preferred embodiment, the non-fluorinated compound of formula $R^{10}—(R^{11})_k—YH$ comprises a hydrophilic water-solvatable material comprising at least one hydroxy-terminated polyether of formula (III):

Formula (III)

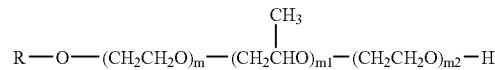

To make the fluoropolymers of the present invention, the perfluoroalkylether ethyl alcohol, or corresponding thiol or amine, is reacted with a polyisocyanate. Typically a reaction vessel is charged with the polyisocyanate; the fluoroalcohol, wherein R is a monovalent hydrocarbon radical containing from about one to about six aliphatic or alicyclic carbon atoms; m and m2 are independently an average number of repeating oxyethylene (EO) groups, and m1 is an average number of repeating oxypropylene (PO) groups, respectively; provided that m is always a positive integer, while m1 and m2 are a positive integer or zero. When m1 and m2 are zero, formula (III) designates an oxyethylene homopolymer. When m1 is a positive integer, and m2 is zero, formula (III) designates a block or random copolymer of oxyethylene and oxypropylene. When m1 and m2 are positive integers, formula (III) designates a triblock copolymer designated PEG-PPG-PEG (polyethylene glycol-polypropylene glycol-polyethylene glycol). More preferably, the hydrophilic, water-solvatable components (3) are the commercially available methoxypolyethylene glycols (MPEG's), or mixtures thereof, having an average molecular weight equal to or greater than about 200, and most preferably between 350 and 2000. Also commercially available and suitable for the preparation of the polyfluoro organic compounds of the present invention are butoxypolyoxyalkylenes containing equal amounts by weight of oxyethylene and oxypropylene groups (Union Carbide Corp. 50-HB Series UCON Fluids and Lubricants) and having an average molecular weight greater than about 1000.

This non-fluorinated compound is reacted in step (i) with the polyisocyanate and fluorinated compound of formula (I) as described above, prior to the reaction with water, linking agent, or a mixture thereof. This initial reaction is conducted so that less than 100% of the polyisocyanate groups are reacted. Following this reaction water, linking agent, or a mixture thereof, is added. The reaction of water or linking agent with the residual NCO groups completely reacts all of the isocyanate groups and eliminates a further purification step that would be needed if other reactants were used at a ratio sufficient to react with 100% of the isocyanate groups. Further, this addition greatly increases the molecular weight of the polymers and assures proper mixing if more than one reactant is used in the first step of the polyurethane preparation, i.e. if a water solvatable component is added it is likely that at least one unit will be present in each polymer.

Linking agents useful in forming polymers of the invention are organic compounds having two or more Zerewitinoff hydrogen atoms (Zerevitinov, Th., Quantitative Determination of the Active Hydrogen in Organic Compounds, Berichte der Deutschen Chemischen Gesellschaft, 1908, 41, 2233-43). Examples include compounds that have at least two functional groups that are capable of reacting with an isocyanate group. Such functional groups include hydroxyl, amino and thiol groups. Examples of polyfunctional alcohols useful as linking agents include: polyoxyalkylenes having 2, 3 or 4 carbon atoms in the oxyalkylene groups, and having two or more hydroxyl groups. Examples include polyether diols such as polyethylene glycol, polyethylene glycol-polypropylene glycol copolymers, and polytetramethylene glycol, polyester diols, for instance, the polyester diols derived from polymerization of adipic acid, or other aliphatic diacids, and organic aliphatic diols having 2 to 30 carbon atoms; non-polymeric polyols including alkylene glycols and polyhydroxyalkanes including 1,2-ethanediol, 1,2-propanol diol, 3-chloro-1,2-propanediol; 1,3-propanediol, 1,3-butanediol, 1,4-butanediol, 2,2-dimethyl-1,3-propanediol, 1,2-, 1,5-, and 1,6-hexanediol, 2-ethyl-1,6-hexanediiol, 1,8-octanediol, 1,10-decanediol, glycerine, trimethylolethane, trimethylolpropane, 2-ethyl-2-(hydroxymethyl)-1,3-propanediol, 1,2,6-hexanetriol, and pentaerythritol.

Preferred polyfunctional amines useful as linking agents include: amine terminated polyethers such as, for example, JEFFAMINE D400, JEFFAMINE ED, and JEFFAMINE EDR-148, all from Huntsman Chemical Co., Salt Lake City, Utah; aliphatic and cycloaliphatic amines including amino ethyl piperazine, 2-methyl piperazine, 4,4'-diamino-3,3'-dimethyl dicyclohexylmethane, 1,4-diaminocyclohexane, 1,5-diamino-3-methylpentane, isophorone diamine, ethylene diamine, diethylene triamine, triethylene tetraamine, triethylene pentamine, ethanol amine, lysine in any of its stereoisomeric forms and salts thereof, hexane diamine, and hydrazine piperazine; and arylaliphatic amines such as xylylenediamine and $\alpha,\alpha,\alpha',\alpha'$-tetramethylxylylenediamine. Mono- and di-alkanolamines that can be used as linking agents include: monoethanolamine, monopropanolamine, diethanolamine, dipropanolamine, and the like.

The fluorinated polymers of the present invention are prepared in a suitable dry organic solvent free of groups that react with isocyanate groups. Ketones are the preferred solvents, and methylisobutylketone (MIBK) is particularly preferred for convenience and availability. The reaction of the alcohols with the polyisocyanate is optionally carried out in the presence of a catalyst, such as dibutyltindilaurate or tetraisopropyl titanate, typically in an amount of about 0.01 to about 1.0% by weight. A preferred catalyst is tetraisopropyl titanate.

The resulting composition is then diluted with water, or further dispersed or dissolved in a solvent selected from the groups comprising simple alcohols and ketones that are suitable as the solvent for final application to substrates (hereinafter the "application solvent").

Alternatively, an aqueous dispersion, made by conventional methods with surfactants, is prepared by removing solvents by evaporation and the use of emulsification or homogenization procedures known to those skilled in the art. Such solvent-free emulsions are preferred to minimize flammability and volatile organic compounds (VOC) concerns.

The final product for application to a substrate is a dispersion (if water based) or a solution (if solvents other than water are used) of the fluorinated polymer.

It will be apparent to one skilled in the art that many changes to any or all of the above procedures may also be used to optimize the reaction conditions for obtaining maximum yield, productivity or product quality.

The present invention further comprises a method of providing water repellency, oil repellency, stain release, hydrophilicity stain release, and cleanability to a substrate comprising contacting the fluorinated polymer of the present invention as described above with the substrate. Suitable substrates include fibrous or hard surface substrates as defined below.

The present invention further comprises a method of providing soil resistance comprising contacting the polymer of the present invention, as a solution or dispersion, with a substrate, provided that the at least one organic diisocyanate, polyisocyanate, or mixture thereof, comprises one or more cyclic diisocyanates selected from the group consisting of 2,4-toluene diisocyanate, 2,6-toluene diisocyanate, diphenylmethane 4,4'-diisocyanate, diphenylmethane 2,4'-diisocyanate, 3-isocyanatomethyl-3,4,4-trimethylcyclohexyl isocyanate, bis-(4-isocyanatocyclohexyl)methane and diisocyanate trimers of formula (IIa) and (IIb):

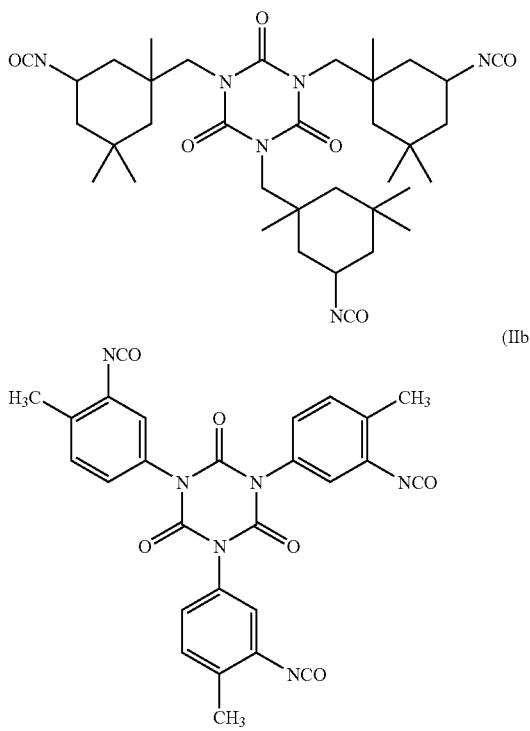

In this embodiment a preferred method is wherein, within the polymer of the invention, said fluorinated compound of formula (I) has p and q each equal to 1, r equal to 0, X equal to —O—, and $R_f$ having 6 carbon atoms. Preferably from about 25% to about 100% by weight, more preferably from about 50% to about 100% by weight, and more preferably from about 75% to about 100% by weight of the cyclic diisocyanate is employed.

The polymer of the present invention, in the form of a solution or dispersion, is contacted with the substrate surface by any suitable method. Such methods are well known to those skilled in the art, and include, for example, application by exhaustion, foam, flex-nip, nip, pad, kiss-roll, beck, skein, winch, liquid injection, overflow flood, roll, brush, roller, spray, dipping, immersion, and the like. Contacting can also be by use of the conventional beck dyeing procedure, continuous dyeing procedure or thread-line application.

The dispersion or solution is diluted for application until the percent total fluorine in the dispersion or solution, based on the weight of the dispersion or solution, is from about 0.001% to about 20%, preferably from about 0.01% to about 15% by weight, and most preferably from about 0.1% to about 10% by weight. Application rates for the solution or dispersion of the present invention are in the range of from about 0.5 to about 1000 g/m².

The composition of this invention is contacted with the substrate as such, or in combination with other finishes or surface treating agents. The composition of the present invention optionally further comprises additional components such as treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. One or more such treating agents or finishes can be combined with the blended composition and applied to the fibrous substrate.

In particular for fibrous substrates, when textiles such as synthetic or cotton fabrics are treated, a wetting agent can be used, such as ALKANOL 6112 available from E. I. du Pont de Nemours and Company, Wilmington, Del. When cotton or cotton-blended fabrics are treated, a wrinkle-resistant resin can be used such as PERMAFRESH EFC available from Omnova Solutions, Chester, S.C.

Other additives commonly used with such treating agents or finishes can also be present such as surfactants, pH adjusters, cross linkers, wetting agents, wax extenders, and other additives known by those skilled in the art. Suitable surfactants include anionic, cationic, and nonionic. Preferred is an anionic surfactant such as sodium lauryl sulfonate, available as DUPONOL WAQE from Witco Corporation, Greenwich, Conn. Examples of such finishes or agents include processing aids, foaming agents, lubricants, anti-stains, and the like. The composition is applied at a manufacturing facility, retailer location, or prior to installation and use, or at a consumer location.

Optionally a blocked isocyanate to further promote durability can be added to the fluorinated polymers of the present invention (i.e., as a blended isocyanate). An example of a suitable blocked isocyanate is HYDROPHOBAL HYDROPHOBOL XAN available from Ciba Specialty Chemicals, High Point, N.J. Other commercially available blocked isocyanates are also suitable for use herein. The desirability of adding a blocked isocyanate depends on the particular application for the treating agent. For most of the presently envisioned applications, it does not need to be present to achieve satisfactory cross-linking between chains or bonding to the substrate. When added as a blended isocyanate, amounts up to about 20% by weight are added.

Optionally, nonfluorinated extender compositions can be included in the application composition to obtain some combination of benefits. Examples of such an optional additional extender polymer composition is that disclosed in co-pending U.S. Provisional Application 60/607,612, filed Sep. 7, 2004 (CH-2996), and in U.S. Ser. No. 11/175,680 filed Jul. 6, 2005 (CH-3048).

The polymers of the present invention are applied to suitable substrates by a variety of customary procedures. For application to washable apparel fabrics, the compounds of the present invention are applied, for example, from an aqueous dispersion or an organic solvent solution by brushing, dipping, spraying, padding, roll-coating, foaming or the like. They can be applied to dyed and undyed textile substrates. For textiles, the polymer of the present invention is preferably applied in an amount from about 5 g/L to about 100 g/L, more preferably from about 10 g/l to about 50 g/L.

In the case of a carpet substrate, the "wet pick up" is the amount of the dispersion or solution of the present invention applied to the pre-wetted carpet, based on the dry weight of the carpet. A low wet pickup bath system can be interchanged with low wet pickup spray or foam systems, and a high wet pickup bath system can be interchanged with other high wet pickup systems, e.g., flex-nip system, foam, pad, or flood. The method employed determines the appropriate wet pickup and whether the application is made from one side of the carpet (spray and foam applications) or both sides (flex-nip and pad). The following Table 2 provides typical process specifications for application to carpet substrates.

TABLE 2

| Application | Wet Pickup Range (%) |
|---|---|
| Flex-nip | 150-350 |
| Flood | 100-500 |
| Foam | 5-300 |
| Pad | 100-500 |
| Spray | 5-300 |

For carpets the percent total fluorine in the dispersion or solution by weight is preferably from about 0.01% to about 20%, more preferably from about 0.01% to about 5%, and more preferably from about 0.01% to about 2%.

Many variations of the conditions for spray, foam, flex-nip, flood, and pad applications are known to those skilled in the art and the preceding conditions are provided as examples and not are intended to be exclusive. The dispersion or solution of the present invention is typically applied to a pre-wetted carpet at a wet pick up of from about 5% to about 500%, and preferably cured at from about 200° F. to about 260° F. (104° C. to 127° C.). Alternatively, the treated carpet can be air-dried. To pre-wet the carpet, the carpet is soaked in water and the excess water suctioned off. The "wet pick up" is the weight of the dispersion or solution of the present invention applied to the carpet based on the dry weight of the carpet face fiber.

For fibrous substrates in general the amount of polymer applied is an amount sufficient to provide at least 100 micrograms per gram to about 5000 micrograms per gram by weight of fluorine based on the weight of dry substrate. For carpets after drying, the treated carpet preferably contains about 100 micrograms per gram to about 1000 micrograms per gram fluorine based on the weight of the dried carpet.

Another embodiment of the invention is a method wherein the polymer of the invention is applied to a substrate as an additive in a coating. Suitable coating compositions, designated herein as a coating base, include a composition, typically a liquid formulation, of an alkyd coating, Type I urethane coating, unsaturated polyester coating, or water-dispersed coating, and is applied to a substrate for the purpose of creating a lasting film on the substrate surface. These are conventional paints, stains, and similar coating compositions. The polymers of the invention improve the cleanability of the dried coatings.

By the term "alkyd coating" as used herein is meant a conventional liquid coating based on alkyd resins, typically a paint, clear coating, or stain. The alkyd resins are complex branched and cross-linked polyesters containing unsaturated aliphatic acid residues. Conventional alkyd coatings utilize, as the binder or film-forming component, a curing or drying alkyd resin. Alkyd resin coatings contain unsaturated aliphatic acid residues derived from drying oils. These resins spontaneously polymerize in the presence of oxygen or air to yield a solid protective film. The polymerization is termed "drying" or "curing" and occurs as a result of autoxidation of the unsaturated carbon-carbon bonds in the aliphatic acid component of the oil by atmospheric oxygen. When applied to a surface as a thin liquid layer of formulated alkyd coating, the cured films that form are relatively hard, non-melting, and substantially insoluble in many organic solvents that act as solvents or thinners for the unoxidized alkyd resin or drying oil. Such drying oils have been used as raw materials for oil-based coatings and are described in the literature.

By the term "urethane coating" as used hereinafter is meant a conventional liquid coating based on Type I urethane resins, typically a paint, clear coating, or stain. Urethane coatings typically contain the reaction product of a polyisocyanate, usually toluene diisocyanate, and a polyhydric alcohol ester of drying oil acids. Urethane coatings are classified by ASTM D-1 into five categories. Type I urethane coatings contain a pre-reacted autoxidizable binder as described in Surface Coatings Vol. I, previously cited. These are also known as uralkyds, urethane-modified alkyds, oil-modified urethanes, urethane oils, or urethane alkyds, are the largest volume category of polyurethane coatings and include paints, clear coatings, or stains. The cured coating is formed by air oxidation and polymerization of the unsaturated drying oil residue in the binder.

By the term "unsaturated polyester coating" as used hereinafter is meant a conventional liquid coating based on unsaturated polyester resins, dissolved in monomers and containing initiators and catalysts as needed, typically as a paint, clear coating, or gel coat formulation. Unsaturated polyester resins contain as the unsaturated prepolymer the product obtained from the condensation polymerization of a glycol such as 1,2-propylene glycol or 1,3-butylene glycol with an unsaturated acid such as maleic (or of maleic and a saturated acid, e.g., phthalic) in the anhydride form. The unsaturated prepolymer is a linear polymer containing unsaturation in the chain. This is dissolved in a suitable monomer, for instance styrene, to produce the final resin. The film is produced by copolymerization of the linear polymer and monomer by means of a free radical mechanism. The free radicals can be generated by heat, or more usually by addition of a peroxide, such as benzoyl peroxide, separately packaged and added before use. Such coating compositions are frequently termed "gel coat" finishes. In order that curing can take place at room temperature, the decomposition of peroxides into free radicals is catalyzed by certain metal ions, usually cobalt. The solutions of peroxide and cobalt compound are added separately to the mix and well stirred before application. The unsaturated polyester resins that cure by a free radical mechanism are also suited to irradiation curing using, for instance, ultraviolet light. This form of cure, in which no heat is produced, is particularly suited to films on wood or board. Other radiation sources, for instance electron-beam curing, are also used.

By the term "water-dispersed coatings" as used herein is meant coatings intended for the decoration or protection of a substrate composed of water as an essential dispersing component such as an emulsion, latex, or suspension of a film-forming material dispersed in an aqueous phase. "Water-dispersed coating" is a general classification that describes a number of formulations and includes members of the above described classifications as well as members of other classifications. Water-dispersed coatings general contain other common coating ingredients. Water-dispersed coatings are exemplified by, but not limited to, pigmented coatings such as latex paints, unpigmented coatings such as wood sealers, stains, and finishes, coatings for masonry and cement, and water-based asphalt emulsions. A water dispersed coating optionally contains surfactants, protective colloids and thickeners, pigments and extender pigments, preservatives, fungicides, freeze-thaw stabilizers, antifoam agents, agents to control pH, coalescing aids, and other ingredients. For latex paints the film forming material is a latex polymer of acrylate acrylic, vinyl-acrylic, vinyl, or a mixture thereof. Such water-dispersed coating compositions are described by C. R. Martens in "Emulsion and Water-Soluble Paints and Coatings" (Reinhold Publishing Corporation, New York, N.Y., 1965).

By the term "dried coating" as used herein is meant the final decorative and/or protective film obtained after the coating composition has dried, set or cured. Such a final film can be achieved by, for non-limiting example, curing, coalescing, polymerizing, interpenetrating, radiation curing, UV curing or evaporation. Final films can also be applied in a dry and final state as in dry coating.

When used as additives the compositions of the present invention are effectively introduced to the coating base or other composition by thoroughly stirring it in at room or ambient temperature. More elaborate mixing can be employed such as using a mechanical shaker or providing heat or other methods. Such methods are not necessary and do not substantially improve the final composition. When used as an additive to coatings, the compositions of the invention generally are added at about 0.001 weight % to about 5 weight % by dry weight of the composition of the invention in the wet coating or paint. Preferably about 0.01 weight % to about 1 weight %, and more preferably 0.1 weight % to about 0.5 weight % is used. The coating compositions containing the additive of the present invention can be applied to a wide variety of fibrous or hard substrates.

The present invention also comprises substrates treated with the composition of the present invention. Suitable substrates include fibrous substrates and hard substrates. The fibrous substrates include woven and nonwoven fibers, yarns, fabrics, fabric blends, paper, leather, and carpets. These are made from natural or synthetic fibers including cotton, cellulose, wool, silk, polyamide, polyester, polyolefin, polyacrylonitrile, polypropylene, rayon, nylon, aramid, and acetate. By "fabric blends" is meant fabric made of two or more types of fibers. Typically these blends are a combination of at least one natural fiber and at least one synthetic fiber, but also can include a blend of two or more natural fibers or of two or more synthetic fibers. Carpet substrates can be dyed, pigmented, printed, or undyed. Carpet substrates can be scoured or unscoured. Substrates to which it is particularly advantageous to apply the polymers of the present invention so as to impart soil resistant properties include those prepared from polyamide fibers (such as nylon), cotton and blends of polyester and cotton, particularly such substrates being used in tablecloths, garments, washable uniforms and the like.

The hard surface substrates include porous and non-porous mineral surfaces, such as glass, stone, masonry, concrete, unglazed tile, brick, porous clay and various other substrates with surface porosity. Specific examples of such substrates include unglazed concrete, brick, tile, stone (including granite and limestone), grout, mortar, marble, limestone, statuary, monuments, wood, composite materials such as terrazzo, and wall and ceiling panels including those fabricated with gypsum board. Such substrates have enhanced cleanability when coated with a coating composition containing the composition of the present invention.

The compositions of the present invention are useful to provide one or more of excellent water repellency, oil repellency, soil resistance, stain release, hydrophilicity stain release, and cleanability to treated substrates. These properties are obtained using lower fluorine concentrations compared with conventional perfluorocarbon surface treatment agents, providing improved "fluorine efficiency" in the protection of treated surfaces.

The compositions of the present invention also allow for the use of shorter fluoroalkyl groups containing 6 or fewer carbon atoms while conventional commercially available surface treatment products typically show poor oil repellency and water repellency performance if the fluoroalkyl groups contain less 8 carbon atoms.

The following examples are intended only to illustrate the invention, and should not be interpreted so as to limit the invention in any way.

Materials and Test Methods

The following materials and test methods were used in the examples herein.

Materials

Residential Carpet

The carpet used for testing in the Examples 2 to 6 consisted of a residential loop carpet construction (30 oz/sq yd) (1112.4 g/m$^2$) having a nylon 6,6 face fiber that had been dyed to a beige color and had received a stain resist treatment of 1.2% SR-500 (100% solids basis). Carpet was obtained from Invista, Inc., Wilmington, Del. SR-500 is available from E. I. duPont de Nemours and Company, Wilmington, Del.

The carpets received a pre-spray application of water at 25% wet pick-up. The carpets were then treated with spray application of the dispersed fluoropolymers of Examples 2 to 6 at 25% wet pick-up. The dispersions were diluted with water, to the degree necessary to obtain a fluorine content of 400 ppm fluorine delivered to the carpet using 25% wet pick-up. Wet pick-up is the weight of the dispersion or solution of the polymer of the present invention applied to the carpet, based on the dry weight of the carpet face fiber. The treated carpet was then dried to a carpet fiber face temperature of 250° F. (121° C.). The application levels for the compositions were such to provide a fluorine level as listed in Tables 6 and 7.

Commercial Carpet

The carpet used for testing of Examples 1 and 3 to 6 consisted of a commercial loop carpet construction (28 oz/sq yd) (1038.2 g/m$^2$) having a nylon 6,6 face fiber that had been dyed to a yellow color. Carpet was obtained from Invista, Inc., Wilmington, Del. SR-500 is available from E. I. duPont de Nemours and Company, Wilmington, Del.

The carpets for received a pre-spray application of water at 25% wet pick-up. The carpets were then treated with spray application of the dispersed fluoropolymers of Examples 1 and 3 to 6 at 25% wet pick-up. The dispersions were diluted with water, to the degree necessary to obtain a fluorine content of 600 ppm fluorine delivered to the carpet using 25% wet pick-up. Wet pick-up is the weight of the dispersion or solution of the polymer of the present invention applied to the carpet, based on the dry weight of the carpet face fiber. The treated carpet was then dried to a carpet fiber face temperature of 250° F. (121° C.). The application levels for the compositions were such to provide a fluorine level as listed in Tables 6 and 7.

Test Method 1—Water Repellency

The water repellency of a treated substrate was measured according to AATCC standard Test Method No. 193-2004 and the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the substrate and the extent of surface wetting is determined visually. The higher the water repellency rating, the better the resistance of a finished substrate to staining by water-based substances.

The water repellency test liquids are shown in Table 3.

TABLE 3

Water Repellency Test Liquids

| Water Repellency Rating Number | Composition, Isopropyl Alcohol | Vol % Distilled Water |
|---|---|---|
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Testing procedure: Three drops of Test Liquid 1 are placed on the treated substrate. After 10 seconds, the drops are removed by using vacuum aspiration. If no liquid penetration or partial absorption (appearance of a darker wet patch on the substrate) is observed, the test is repeated with Test Liquid 2. The test is repeated with Test Liquid 3 and progressively higher Test Liquid numbers until liquid penetration (appearance of a darker wet patch on the substrate) is observed. The test result is the highest Test Liquid number that does not penetrate into the substrate. Higher scores indicate greater repellency.

Test Method 2—Oil Repellency

The treated samples were tested for oil repellency by a modification of AATCC standard Test Method No. 118, conducted as follows. A substrate treated with an aqueous dispersion of polymer as previously described, is conditioned for a minimum of 2 hours at 23° C. and 20% relative humidity and 65° C. and 10% relative humidity. A series of organic liquids, identified below in Table 4, are then applied dropwise to the samples. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating is the highest numbered test liquid for which two of the three drops remained spherical to hemispherical, with no wicking for 30 seconds. In general, treated samples with a rating of 5 or more are considered good to excellent; samples having a rating of one or greater can be used in certain applications.

TABLE 4

Oil Repellency Test Liquids

| Oil Repellency Rating Number | Test Solution |
|---|---|
| 1 | NUJOL Purified Mineral Oil |
| 2 | 65/35 NUJOL/n-hexadecane by volume at 21° C. |

TABLE 4-continued

Oil Repellency Test Liquids

| Oil Repellency Rating Number | Test Solution |
|---|---|
| 3 | n-hexadecane |
| 4 | n-tetradecane |
| 5 | n-dodecane |
| 6 | n-decane |
| 7 | n-octane |
| 8 | n-heptane |

Note:
NUJOL is a trademark of Plough, Inc., for a mineral oil having a Saybolt viscosity of 360/390 at 38° C. and a specific gravity of 0.880/0.900 at 15° C.

Test Method 3—Accelerated Soiling Drum Test.

A drum mill (on rollers) was used to tumble synthetic soil onto carpet samples. Synthetic soil was prepared as described in AATCC Test Method 123-2000, Section 8. Soil-coated beads were prepared as follows. Synthetic soil, 3 g, and 1 liter of clean nylon resin beads (SURLYN ionomer resin beads ⅛-³⁄₁₆ inch (0.32-0.48 cm) diameter were placed into a clean, empty canister. SURLYN is an ethylene/methacrylic acid copolymer, available from E. I. du Pont de Nemours and Co., Wilmington Del.). The canister lid was closed and sealed with duct tape and the canister rotated on rollers for 5 minutes. The soil-coated beads were removed from the canister.

Carpet samples to insert into the drum were prepared as follows. Total carpet sample size was 8×25 inch (20.3×63.5 cm) for these tests. One test sample and one control sample were tested at the same time. The carpet pile of all samples was laid in the same direction. The shorter side of each carpet sample was cut in the machine direction (with the tuft rows). Strong adhesive tape was placed on the backside of the carpet pieces to hold them together. The carpet samples were placed in the clean, empty drum mill with the tufts facing toward the center of the drum. The carpet was held in place in the drum mill with rigid wires. Soil-coated resin beads, 250 cc, and 250 cc of ball bearings (⁵⁄₁₆ inch, 0.79 cm diameter) were placed into the drum mill. The drum mill lid was closed and sealed with duct tape. The drum was run on the rollers for 2½ minutes at 105 rpm. The rollers were stopped and the direction of the drum mill reversed. The drum was run on the rollers for an additional 2½ minutes at 105 rpm. The carpet samples were removed and vacuumed uniformly to remove excess dirt. The soil-coated beads were discarded.

The Delta E color difference for the soiled carpet was measured for the test and control items versus the original unsoiled carpet. Color measurement of each carpet was conducted on the carpet following the accelerated soiling test. For each control and test sample the color of the carpet was measured, the sample was soiled, and the color of the soiled carpet was measured. The Delta E is the difference between the color of the soiled and unsoiled samples, expressed as a positive number. The color difference was measured on each item, using a Minolta Chroma Meter CR-310. Color readings were taken at five different areas on the carpet sample, and the average Delta E was recorded. The control carpet for each test item was of the same color and construction as the test item. The control carpet had not been treated with any fluorochemical. A lower Delta E indicates less soiling and superior soil resistance.

Test Method 4—Wicking Test

For the wicking testing, 5 drops of DI water were placed on the cotton samples on different areas of the material. The time (in seconds) it took to completely absorb into the cotton was recorded. 180 Seconds (3 minutes) was the point where, if the drop had not been absorbed, the test was rated as a fail. Wicking is an indication of hydrophilicity, and test results are referred to herein either as wicking or hydrophilicity stain release.

Test Method 5—Stain Release

The stain release test was taken from the AATCC Test Method 130-1995. Five drops of either mineral oil or corn oil were placed in the center of the treated cotton sample on a piece of blotter paper. A piece of glassine paper (weighing paper) was placed over the spot and a five-pound weight was placed on top of the paper. After 60 seconds, the weight and glassine paper were removed. Four red dots were marked around the oil spot. The cotton material was placed in the Kenmore washing machine with the following settings of Large load, Warm (100° F.)/Cold, One rinse, Ultra Clean (setting 12), and Normal (fast/slow). Then 100 g of AATCC WOB detergent and 4 lbs. of material including ballasts were added to the washing machine. After washing, the samples were placed in the Kenmore dryer on the high setting for 45 minutes. The samples were rated based on the Stain Release Replica.

TABLE 5

| Stain Release Grades | |
| --- | --- |
| Grade 5 | Stain equivalent to Standard Stain 5 |
| Grade 4 | Stain equivalent to Standard Stain 4 |
| Grade 3 | Stain equivalent to Standard Stain 3 |
| Grade 2 | Stain equivalent to Standard Stain 2 |
| Grade 1 | Stain equivalent to Standard Stain 1 |

Grade 5 represents the best stain removal and Grade 1 the poorest stain removal.

Test Method 6—Wash Durability

The fabric samples were washed following the washing procedure of International Standard for textile testing. Fabric samples are loaded into a horizontal drum, front-loading type (Type A, WASCATOR Fom71 MP-Lab) of automatic washing machine with a ballast load to give a total dry load of 4 lb. A commercial detergent is added (AATCC 1993 standard Reference Detergent WOB) and the washer programmed with high water level with warm water (105° F., 41° C.), 15 minutes normal wash cycle followed by 2 times 13 minutes rinse and then 2 minutes spin dry. The sample and ballast are washed a designated number of times (5 HW for 5 washes, 20 HW for 20 washes etc.). After washing, the samples were placed in the Kenmore dryer on the high setting for 45 minutes. The samples are again tested for stain release using Test Methods 4 and 5. Testing for hydrophilic stain release (wicking) was on 100% Avondale Cotton based on same weight loading (bath concentration 30 g/L)

Test Method 7—Leneta Oil Cleanability Test

The test method described herein is a modification of ASTM 3450-00—Standard Test Method for Washability Properties of Interior Architectural Coatings, which is hereby specifically incorporated by reference.

Drawdowns were prepared by applying a coat of coating composition on Leneta Black MYLAR cards (The Leneta Company, Mahwah, N.J.) using a BYK-Gardner automatic drawdown machine (BYK-Gardner, Silver Spring, Md.) and a 5 mil (0.127 mm) Bird applicator drawdown blade (BYK-Gardner, Silver Spring, Md.). The drawdown speed was set to be slow enough to prevent pinholes or holidays in the resulting coating. Several drawdowns were prepared for each paint and additive combination. The coated cards were allowed to dry for seven days for testing for cleanability.

Staining media were prepared using VASELINE NURSERY JELLY (Marietta Corporation, Cortland, N.Y.) and Leneta Carbon Black Dispersion in Mineral Oil (ST-1) (The Leneta Company, Mahwah, N.J.). The petroleum jelly was melted in a clean glass container for 30 minutes in an oven set at 70° C. Then the petroleum jelly was mixed with 5% of its weight of Leneta Carbon Black. For instance, 95 g of petroleum jelly was mixed with 5 g of Leneta Carbon Black to produce 100 g of staining media. The mixed staining media was cooled for several hours in a refrigerator at 4° C.

Cleaning media were prepared using a JOY ULTRA CONCENTRATED COUNTRY LEMON dishwashing liquid (The Procter & Gamble Company, Cincinnati, Ohio). Dishwashing liquid was mixed with deionized water at a ratio of 1 g of dishwashing liquid for every 99 g of water.

Each drawdown was stained in the same manner. A staining template was prepared from a MYLAR Leneta card by cutting out a 3" by 1" (7.6 cm by 2.5 cm) strip from the interior of the card. The template was placed over a coated drawdown card to be stained. Staining media was spread over the drawdown card and the template using a spatula so that none of the drawdown card remained visible. Excess stain was removed with a spatula. Stained cards were allowed to set and dry for 60 minutes.

In preparation for cleaning, scrap MYLAR was used to gently scrape the excess dried stain from the stained section of the card, both the washed and unwashed sections. Similarly a c-folded clean paper towel was used to remove unset stain from the entire card, both the washed and unwashed sections. The card was then securely attached to a BYK-Gardner Abrasion tester (BYK-Gardner, Silver Spring, Md.) or other method. A piece of cheesecloth (VWR International, San Diego, Calif.) was attached to the cleaning block on the abrasion tester. The cheesecloth was folded and attached so that the contacting surface was 8 layers thick. 10 mL of cleaning solution prepared as specified above was applied to the contacting surface of the cheesecloth. The abrasion tester was run through 5 cycles (10 wipes) over a stained section of the drawdown card that is henceforth designated as stained and cleaned. Excess cleaning solution was rinsed away with deionized water for a few seconds and then allowed to dry for 2 hours or until completely dry by visible inspection. One section of each stained drawdown card was cleaned in this manner.

Cleanability was determined by evaluating the stained and washed painted portion of the drawdown card in comparison to both the unstained and painted portion of the card and the stained and unwashed painted portion of the card. A Hunter-Lab ULTRASCAN Pro colorimeter (Hunter Associates Laboratory, Inc, Reston, Va.) was used to take three different measurements for each designated painted portion of the drawdown card: stained and washed, unstained, and stained and unwashed. The measurements were averaged to obtain a mean value for that section that is used to evaluate the cleanability rating for that card as described below. The colorimeter was set to read the L* function and the aperture was no larger than ¾ of an inch (1.9 cm).

A cleanability score was calculated ranging from 0-10 wherein 0 is uncleanable, and 10 is completely cleanable. Values 1-9 were established in numerical order equidistant from 0, 10, and one another on a linear slope. The above description fits the following equation: [(mean L* value of stained and washed painted section)–(mean L* value of stained and unwashed painted section)]/[(mean L* value of unstained painted section)−(mean L* value of stained and unwashed painted section)]*10=cleanability rating.

EXAMPLES

Example 1

$C_3F_7OCF_2CF_2I$ (100 g, 0.24 mol) and benzoyl peroxide (3 g) were charged to a pressure vessel under nitrogen. A series of three vacuum/nitrogen gas sequences was then executed at −50° C. and ethylene (18 g, 0.64 mol) was introduced. The vessel was heated for 24 hour at 110° C. The autoclave was cooled to 0° C. and opened after degassing. Then the product was collected in a bottle. The product was distilled giving 80 g of $C_3F_7OCF_2CF_2CH_2CH_2I$ in 80% yield. The boiling point was 56~60° C. at 25 mm Hg (3333 Pa).

A mixture of $C_3F_7OCF_2CF_2CH_2CH_2I$ (300 g, 0.68 mol) and N-methyl-formamide (300 mL), was heated to 150° C. for 26 h. Then the reaction was cooled to 100° C., followed by the addition of water to separate the crude ester. Ethyl alcohol (77 mL) and p-toluene sulfonic acid (2.59 g) were added to the crude ester, and the reaction was stirred at 70° C. for 15 minutes. Then ethyl formate and ethyl alcohol were distilled out to give a crude product. The crude product was dissolved in ether, washed with aqueous sodium sulfite, water, and brine in turn, then dried over magnesium sulfate. The product was then distilled to give 199 g of $C_3F_7OCF_2CF_2CH_2CH_2OH$ in 85% yield. The boiling point was 71~73° C. at 40 mm Hg (5333 Pa).

To a 3-neck 250 mL round-bottom flask, equipped with a reflux condenser with a nitrogen inlet, a magnetic stirrer, and a temperature probe, was added $C_3F_7OCF_2CF_2CH_2CH_2OH$ alcohol (20.30 g, 61.50 mmol) that was dried over sodium sulfate, and DESMODUR N100 (63% in methyl isobutyl ketone, MIBK, 23.43 g, 78.11 mmol NCO). The mixture was heated to 55° C. To the solution, dibutyl tin dilaurate (2.0 g of 0.4 wt % catalyst in MIBK) was added dropwise resulting in an exotherm of 30° C. The reaction was held at 84° C. for 2 h. MIBK (28.75 g) and water (0.23 g) were added dropwise to the reaction followed by heating for 24 h at 84° C. until isocyanate was no longer detected, using a Colormetric Technologies, Inc isocyanate test strip. The hot product (20.0 g) was added to a hot surfactant solution (70° C., 20 g deionized water and 1.63 g Witco C6094 surfactant). The solution was homogenized using a digital sonifier for 5 minutes and MIBK was removed via vacuum distillation to yield a stable dispersion of the urethane polymer (15.5% solids, 6.11% F).

The dispersion was applied to carpet as described above under "Materials". The carpets were tested for water repellency by Test Method 1, for oil repellency by Test Method 2 Results are listed in Table 6.

Example 2

The sample was prepared using the method described for Example 1, except that the hot product (20.0 g) was added to a hot surfactant solution (70° C., 20 g deionized water, 0.32 g MERPOL SE and 1.46 g ARQUAD 16-50 surfactants). The solution was homogenized using a digital sonifier for 5 minutes and MIBK was removed via vacuum distillation to yield a stable dispersion of urethane polymer (15.5% solids, 5.51% F).

The dispersion was applied to carpet as described above under "Materials". The carpets were tested for water repellency by Test Method 1 and for oil repellency by Test Method 2. Results are listed in Table 6.

Example 3

To a 3-neck 250 mL round-bottom flask, equipped with a reflux condenser with a nitrogen inlet, a magnetic stirrer, and a temperature probe, was added $C_3F_7OCF_2CF_2CH_2CH_2OH$ alcohol prepared as in Example 1 (24.65 g, 74.67 mmol) that was dried over sodium sulfate, and DESMODUR N3300 (17.98 g, 93.34 mmol (NCO)) in 11 g MIBK. The mixture was heated to 65° C. To the solution, dibutyl tin dilaurate (2.4 g of 0.4 wt % catalyst in MIBK) was added dropwise resulting in an exotherm of 30° C. The reaction was held at 84° C. for 3 h. MIBK (34.40 g) and water (0.27 g) were added dropwise to the reaction followed by heating for 24 h at 84° C. Additional water 0.27 g was added and the reaction was heated until isocyanate was no longer detected. The hot product (40.0 g) was added to a hot surfactant solution (70° C., 65 g deionized water and 3.09 g Witco C6094 surfactant). The solution was homogenized using a digital sonifier for 5 min and MIBK was removed via vacuum distillation to yield a stable dispersion (24% solids, 8.9% F).

The dispersion was applied to carpet as described above under "Materials". The carpet was tested for water repellency, and oil repellency using Test Methods 1 and 2 respectively. The resulting data are in Table 6.

Example 4

The sample was prepared using the method described for Example 3, except that the hot product (12.5.0 g) was added to a hot surfactant solution (70° C., 12.5 g deionized water, 0.70 g SADPO and 0.05 g TERGITOL surfactant). The solution was homogenized using a digital sonifier for 5 minutes and MIBK was removed via vacuum distillation to yield a stable dispersion (24% solids, 8.9% F).

The dispersion was applied to carpet as described above under "Materials". The carpet was tested for water repellency and oil repellency using Test Methods 1 and 2 respectively. The resulting data are in Table 6.

Example 5

To a 4-neck 500 mL round-bottom flask, equipped with a reflux condenser with a nitrogen inlet, an overhead stirrer, and a temperature probe, was added $C_3F_7OCF_2CF_2CH_2CH_2OH$ alcohol prepared as in Example 1 (19.00 g, 57.58 mmol) that was dried over sodium sulfate, butyl acetate (3 g), and DESMODUR Z4470 (70% in butyl acetate, 27.10 g, 76.77 mmol NCO). The mixture was heated to 65° C. To the solution, dibutyl tin dilaurate (1.4 g of 0.4 wt % catalyst in MIBK) was added dropwise resulting in an exotherm of 17° C. The reaction was held at 84° C. for 4 h. Butyl acetate (32 g) and water (0.35 g) were added dropwise to the reaction followed by heating for 8 h at 84° C. Butyl acetate (20 g) and water (0.35 g) were added and heating continued for 5 h until isocyanate was no longer detected. The hot product (15.0 g) was added to a hot surfactant solution (70° C., 28 g deionized water, 0.24 g Merpol SE and 1.107 g Arquad 16-50 surfactants). The solution was homogenized using a digital sonifier for 5 min and butyl acetate was removed via vacuum distillation to yield a stable dispersion of urethane polymer (20.0% solids, 4.6%. F).

The dispersion was applied to carpet as described above under "Materials". The carpets were tested for water repellency by Test Method 1, for oil repellency by Test Method 2. Soiling performance of the carpets was evaluated by Test Method 3 accelerated soiling test and evaluated by the color measurement of soiling performance. Results are listed in Tables 6 and 7.

Example 6

The sample was prepared using the method described for Example 5, except that the hot product (15.0 g) was added to a hot surfactant solution (70° C., 28 g deionized water, 0.07 g BRIG 58 and 0.30 g ARQUAD 2HT-75 surfactants). The solution was homogenized using a digital sonifier for 5 minutes and butyl acetate was removed via vacuum distillation to yield a stable dispersion (20.0% solids, 5.0% F).

The dispersion was applied to carpet as described above under "Materials". The carpets were tested for water repellency by Test Method 1, for oil repellency by Test Method 2. Soiling performance of the carpets was evaluated by Test Method 3 accelerated soiling test and evaluated by the color measurement of soiling performance. Results are listed in Tables 6 and 7.

TABLE 6

| | | | Carpet Repellency | |
|---|---|---|---|---|
| Example | Type of | Final ppm | Repellency | |
| No | Carpet | F$^a$ | Water | Oil |
| 1 | Commercial | 600 | 4 | 4 |
| 2 | Residential | 400 | 4 | 4 |
| 3 | Residential | 400 | 4 | 3 |
| 4 | Residential | 400 | 4 | 3 |
| 3 | Commercial | 600 | 4 | 4 |
| 4 | Commercial | 600 | 4 | 4 |
| 5 | Residential | 400 | 5 | 2 |
| 6 | Residential | 400 | 5 | 2 |
| 5 | Commercial | 600 | 4 | 2 |
| 6 | Commercial | 600 | 5 | 2 |

The data in Table 6 demonstrates that oil and water repellency were achieved using multiple isocyanate reactants and surfactant packages.

TABLE 7

| | Soil Resistance | | |
|---|---|---|---|
| Example | Type of Carpet | Final PPM F | Delta E |
| Untreated | Residential | 0 | 21.54 |
| 5 | Residential | 400 | 16.87 |
| 6 | Residential | 400 | 16.81 |
| Untreated | Commercial | 0 | 34.88 |
| 5 | Commercial | 600 | 27.18 |
| 6 | Commercial | 600 | 28.75 |

The data is Table 7 demonstrates that Examples 5 and 6 were functional soil resists for both commercial and residential carpets.

Example 7

Under a nitrogen gas blanket the flask was charged with DESMODUR N100 (63% in MIBK, 22.1 g, 0.0736 mol NCO), methoxypolyoxyethylene glycol (MPEG 750, molecular weight of about 750, 11.95 g, 0.0147 mol) and $C_3F_7OCF_2CF_2CH_2CH_2OH$ (10 g, 0.03 mol) prepared as in Example 1. The reaction mixture was heated to 65° C., followed by adding 5% by weight titanium (IV) isopropoxide in methyl isobutyl ketone (MIBK) (1.2 g). After 3 h at 95° C., MIBK (13.6 mL) and water (4.6 mL) were added at 85° C. Once water was added the temperature was dropped to 75° C. and allowed to stir overnight. More water (80.46 mL) was added to the reaction and stirred for 0.5 h. After evaporating MIBK at reduced pressure, the resulting polymer was obtained (26.04 solids).

Fabric samples, 100% Avondale cotton, were treated with the water based fluorinated polymer formulation using a conventional pad bath (dipping) process. A bath containing 30-50 g/L of the fluorinated polymer treating agent was used. After application, the fabric samples were cured at approximately 165° C. for 2 minutes, and allowed to "rest" after treatment and cure. The samples were tested for wicking, stain release and wash durability using Test Methods 4, 5 and 6 respectively. Results are in Table 8.

Example 8

$C_2F_5OCF_2CF_2I$ (116 g, 0.32 mol) and benzoyl peroxide (4 g) were charged to a vessel under nitrogen. A series of three vacuum/nitrogen gas sequences was then executed at −50° C. and ethylene (24 g, 0.86 mol) was introduced. The vessel was heated for 24 h at 110° C. The autoclave was cooled to 0° C. and opened after degassing. The product was collected in a bottle. Six runs were combined, and the product distilled to provide $C_2F_5OCF_2CF_2CH_2CH_2I$ (470 g, 64% yield, bp 135~137° C. at 760 mm Hg (1013×10$^2$ Pa)).

A flask was charged with 130 g of $C_2F_5OCF_2CF_2CH_2CH_2I$, 643 mL of the N-methyl pyrrolidone and 48 mL of deionized water. The mixture was heated to 132° C. for 20 h. Deionized water was added and the lower layer was separated. The lower layer was dissolved in ether, washed with saturated sodium sulfite solution, and dried over anhydrous sodium sulfate. After rotary vaporization 48 g of $C_2F_5OCF_2CF_2CH_2CH_2OH$ in 52% yield, bp 70~72° C. at 60 mm Hg. (7999 Pa).

Under a nitrogen gas blanket a flask was charged with DESMODUR N-100 (63% in MIBK, 21.02 g, 0.07 mol NCO), methoxypolyoxyethylene glycol (MPEG 750, 10.5 g, 0.014 mol) and $C_2F_5OCF_2CF_2CH_2CH_2OH$ (8.0 g, 0.028 mol). The mixture was heated to 65° C., followed by adding 5% titanium (IV) isopropoxide in MIBK (1.15 g). After 3 h at 95° C., MIBK (13 mL) and water (4.16 mL) were added at 85° C. Once the water was added, the temperature was dropped to 75° C. and the liquid allowed to stir overnight. More water (76.71 mL) was added to the reaction and stirred for 0.5 h. After evaporating MIBK at reduced pressure, the resulting polymer was obtained (29.05% solids).

Fabric samples, 100% Avondale cotton, were treated with the water based fluorinated polymer formulation using a conventional pad bath (dipping) process. A bath containing 30-50 g/L of the fluorinated polymer treating agent was used. After application, the fabric samples were cured at approximately 165° C. for 2 minutes, and allowed to "rest" after treatment and cure. The samples were tested for wicking, stain release and wash durability using Test Methods 4, 5 and 6 respectively. Results are in Table 8.

Example 9

$CF_3OCF_2CF_2I$ (285 g, 0.91 mol) and benzoyl peroxide (12 g) were charged to a vessel under nitrogen. A series of three vacuum/nitrogen gas sequences were then executed at −50° C., after which ethylene (69 g, 2.46 mol) was introduced. The vessel was heated for 24 hours at 110° C. The autoclave was cooled to 0° C. and opened after degassing. Then the product was collected in a bottle. Two runs were combined and the product was distilled giving 292 g of $CF_3OCF_2CF_2CH_2CH_2I$ in 50% yield. The boiling point of the product was 56~60° C. at 60 mmHg pressure [7999 Pa].

A mixture of $CF_3OCF_2CF_2CH_2CH_2I$, (92 g, 0.27 mol) and N-methyl-formamide (119 mL), was heated to 150° C. for 26 hours. Then the reaction was cooled to 100° C., followed by the addition of water to separate the crude ester. Ethyl alcohol (30 mL) and p-toluene sulfonic acid (1.03 g) were added to the crude ester, and the reaction was stirred at 70° C. for 15 minutes. Then ethyl formate and ethyl alcohol were distilled out to give a crude product. The crude product was dissolved in ether, washed with aqueous sodium sulfite, water, and brine in turn, then dried over magnesium sulfate. The product $CF_3OCF_2CF_2CH_2CH_2OH$ was then distilled to give 44 g product in 71% yield.

Under a nitrogen gas blanket the flask was charged with DESMODUR N-100 (63% in MIBK, 19.11 g, 0.0647 mol NCO), methoxypolyoxyethylene glycol (MPEG 750, 9.59 g, 0.013 mol) and $CF_3OCF_2CF_2CH_2CH_2OH$ (6 g, 0.026 mol). The reaction mixture was heated to 65° C., followed by adding 5% titanium (IV) isopropoxide in MIBK (1.04 g). After 3 hours at 95° C., MIBK (11.82 mL) and water (3.78 mL) were added at 85° C. Once water was added the temperature was dropped to 75° C. and the liquid allowed to stir overnight. More water (69.73 mL) was added to the reaction and stirred for 0.5 hour. After evaporating MIBK at reduced pressure, the resulting polymer (27.05% solids) was obtained.

Fabric samples, 100% Avondale cotton, were treated with the water based fluorinated polymer formulation using a conventional pad bath (dipping) process. A bath containing 30-50 g/L of the fluorinated polymer treating agent was used. After application, the fabric samples were cured at approximately 165° C. for 2 minutes, and allowed to "rest" after treatment and cure. The samples were tested for wicking, stain release and wash durability using Test Methods 4, 5 and 6 respectively. Results are in Table 8.

Comparative Example A

The procedure of Example 7 was employed, but using as the fluorochemical a perfluoroalkylethyl alcohol mixture of the formula $F(CF_2)_aCH_2CH_2OH$, wherein a ranged from 6 to 14, and was predominately 6, 8, and 10. The typical mixture was as follows: 27% to 37% of a=6, 28% to 32% of a=8, 14% to 20% of a=10, 8% to 13% of a=12, and 3% to 6% of a=14.

Fabric samples, 100% Avondale cotton, were treated with the water based fluorinated polymer formulation using a conventional pad bath (dipping) process. A bath containing 30-50 g/L of the fluorinated polymer treating agent was used. After application, the fabric samples were cured at approximately 165° C. for 2 minutes, and allowed to "rest" after treatment and cure. The samples were tested for wicking, stain release and wash durability using Test Methods 4, 5 and 6 respectively. Results are in Table 8.

TABLE 8

|  | Comparative Example A | Example 7 | Example 8 | Example 9 |
|---|---|---|---|---|
| % Fluorine | 0.3 | 0.19 | 0.18 | 0.14 |
| Wicking (Horz/sec) |  |  |  |  |
| Initial | >180 | 7 | 10 | 6 |
| 5HW | 23 | 3 | 2 | 1 |
| Stain Release-Initial |  |  |  |  |
| Mineral oil | 4 | 4 | 3+ | 4 |
| Corn Oil | 4 | 4 | 3+ | 3 |

TABLE 8-continued

|  | Comparative Example A | Example 7 | Example 8 | Example 9 |
|---|---|---|---|---|
| Stain Release-5HW |  |  |  |  |
| Mineral Oil | 4 | 4 | 3 | 3 |
| Corn Oil | 4 | 3+ | 3+ | 3 |

The data in Table 8 demonstrates that the compositions of the present invention (Examples 7-9) had excellent stain release property, generally comparable to the control (Comparative Example A). They gave a much better hydrophilicity, with ratings of 1 to 10 seconds initial wicking time, compared to the control rating of >180 seconds wicking time using the homologue mixture. Therefore the polymer of the present invention is a good hydrophilic stain release product compared to Comparative Example A.

Example 10

Under a nitrogen gas blanket a flask was charged with DESMODUR N-100D (63% in MIBK, 8.79 g, 0.03 mol NCO), methoxypolyoxyethylene glycol (MPEG 350, molecular weight of about 350.)(4.4 g, 0.0125 mol) and $C_3F_7OCF_2CF_2CH_2CH_2OH$ (4.13 g, 0.0125 mol) prepared as in Example 1. The reaction mixture was heated to 55° C., followed by adding 0.4% dibutyl tin dilaurate in methyl isobutyl ketone (MIBK) methyl isobutyl ketone (0.35 g). After 16 h at 90° C., water (0.225 g) was added at 60° C. and reaction was stirred for 3 h. MIBK (4 mL) and water (31.5 mL) were added and the reaction was stirred for 1 h. After evaporating MIBK at reduced pressure, the resulting product was poured into a bottle for coating testing.

The product was added to acrylic latex paint at the level indicated in Table 9 based upon dry weight of the polymer. The samples were tested for cleanability using Test Method 7. Results are in Table 9.

Example 11

Under a nitrogen gas blanket a flask was charged with DESMODUR N-100 (63% in MIBK, 8.79 g, 0.03 mol NCO), methoxypolyoxyethylene glycol (MPEG 350, molecular weight of about 350)(4.4 g, 0.0125 mol) and $C_2F_5OCF_2CF_2CH_2CH_2OH$ (3.5 g, 0.0125 mol) prepared as in Example 8. The reaction mixture was heated to 55° C., followed by adding 0.4% dibutyl tin dilaurate in methyl isobutyl ketone (MIBK) (0.35 g). After 16 h at 90° C., water (0.225 g) was added at 60° C. and reaction was stirred for 3 h. MIBK (4 mL) and water (31.5 mL) were added and the reaction was stirred for 1 h. After evaporating MIBK at reduced pressure, the material was poured into a bottle for coating test.

The product was added to acrylic latex paint at the level indicated in Table 9 based upon dry weight of the polymer. The samples were tested for cleanability using Test Method 7. Results are in Table 9.

Example 12

Under a nitrogen gas blanket a flask was charged with DESMODUR N-100 (63% in MIBK, 8.79 g, 0.03 mol NCO), methoxypolyoxyethylene glycol (MPEG 350, molecular weight of about 350)(4.4 g, 0.0125 mol) and $CF_3OCF_2CF_2CH_2CH_2OH$ (2.9 g, 0.0125 mol) prepared as in Example 9. The reaction mixture was heated to 55° C., followed by adding 0.4% dibutyl tin dilaurate in methyl isobutyl ketone (MIBK) (0.35 g). After 16 h at 90° C., water (0.225 g) was added at 60° C. and reaction was stirred for 3 h. MIBK (4 mL) and water (31.5 mL) were added and the reaction was stirred for 1 h. After evaporating MIBK at reduced pressure, the material was poured into a bottle for coating test.

The product was added to flat acrylic latex paint having 3% gloss at 85 degrees at the level indicated in Table 9 based upon dry weight of the polymer. The Examples were added to the base coating in an amount to achieve a fluorine content of 675 microgram/gram F based on the weight of the wet paint. The samples were tested for cleanability using Test Method 7. Results are in Table 9.

TABLE 9

| Examples* | Cleanability | |
|---|---|---|
| | Weight % | Cleanability Rating |
| Control[a] | | 3.8 |
| 10 | 2.34 | 5.3 |
| 11 | 1.69 | 6.1 |
| 12 | 2.27 | 5.2 |

*Examples 10, 11 and 12 had equivalent fluorine content.
[a]Latex paint without fluorinated composition additive The data in Table 9 demonstrates that Examples 10-12 had improved cleanability compared to the control. The control consisted of the same acrylic paint with no composition of the present invention added.

Example 13

To a 3-neck round-bottom flask, equipped with a reflux condenser with a nitrogen inlet, a magnetic stirrer, and a temperature probe, was added compound $C_3F_7OCF_2CF_2CH_2CH_2OH$ (10.10 g, 30.6 mmol, previously dried over sodium sulfate), and DESMODUR W (63% in MIBK, 5.54 g, 41.9 mmol NCO). The mixture was heated to 55° C., followed by the drop-wise addition of dibutyl tin dilaurate (1.07 g of a 0.4 wt % solution in MIBK) resulting in an exotherm. The reaction was held at 84° C. for 2 h, followed by drop-wise addition of MIBK (15.42 g) and water (0.10 g) and continued heating at 84° C. overnight. Second portion of water (0.10 g) was added and the reaction was stirred until isocyanate was no longer detected, using an isocyanate test strip. The hot product (5 g) was added to a hot surfactant solution (70° C., 5 g deionized water, 0.41 g Witco C6094 surfactant). The solution was homogenized using a digital sonifier for 5 minutes and MIBK was removed via vacuum distillation to provide an aqueous dispersion of urethane polymer (13) for carpet application (12% solids, 3.47% F).

The dispersion was applied to carpet as described above under "Materials". The carpets were tested for water repellency by Test Method 1, for oil repellency by Test Method 2. Soiling performance of the carpets was evaluated by Test Method 3 accelerated soiling test and evaluated by the color measurement of soiling performance. Results are listed in Tables 10 and 11.

Example 14

Another sample was prepared using the method described for example 13, except that the hot product (5 g) was added to a hot surfactant solution ((70° C., 5 g deionized water, 0.08 g of MERPOL SE surfactant, from E.I. DuPont de Nemours, Wilmington, Del., and 0.37 g ARQUAD 16-50 surfactant, Akzo Nobel, Chicago). The solution was homogenized using a digital sonifier for 5 minutes and MIBK was removed via vacuum distillation to provide an aqueous dispersion of urethane polymer (14) for carpet application (12% solids, 4.5% F).

The dispersion was applied to carpet as described above under "Materials". The carpets were tested for water repellency by Test Method 1, for oil repellency by Test Method 2. Soiling performance of the carpets was evaluated by Test Method 3 accelerated soiling test and evaluated by the color measurement of soiling performance. Results are listed in Tables 10 and 11.

TABLE 10

| | Commercial Carpet | | | |
|---|---|---|---|---|
| Example | Final ppm F | Water Repellency | Oil Repellency | Delta E |
| Untreated | 0 | 0 | 0 | 50.29 |
| 1A | 600 | 4 | 3 | 48.51 |

TABLE 11

| | Residential Carpet | | | |
|---|---|---|---|---|
| Example | Final ppm F | Water Repellency | Oil Repellency | Delta E |
| Untreated | 0 | 0 | 0 | 29.13 |
| 1B | 400 | 6 | 5 | 26.85 | ppm F is micrograms per gram of fluorine

The data in Tables 10 and 11 demonstrates that the polymers of the present invention made using a cyclic isocyanate provide excellent water repellency, oil repellency and soil resistance to carpet.

What is claimed is:

1. A composition comprising a polymer containing at least one urea linkage prepared by
   (i) reacting (1) at least one organic diioscyanate, polyisocyanate, or mixture thereof, having isocyanate groups, and (2) at least one fluorochemical compound of Formula I $$R_f\text{—}O(CF_2CF_2)_r(CH_2CH_2)_q(R^1)_sXH \qquad \text{Formula (I)}$$

wherein
   $R_f$ is a linear or branched $C_1$ to $C_7$ perfluoroalkyl optionally interrupted by one to three oxygen atoms,
   r is 1 to 3, q is 1 to 3, s is 0 or 1,
   X is O, S, or $NR^2$ wherein $R^2$ is H, or $C_1$ to $C_6$ alkyl, and
   $R^1$ is a divalent radical selected from —$S(CH_2)_n$—,

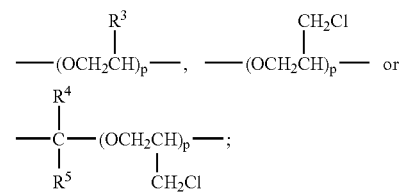

p is 1 to 50, and $R^3$, $R^4$ and $R^5$ are each independently H or $C_1$ to $C_6$ alkyl;
   (ii) and then reacting with (3) water, a linking agent, or a mixture thereof, said composition providing water repellency, oil repellency, stain release, wicking, and cleanability to a substrate treated therewith.

2. The composition of claim 1 wherein $R_f$ is linear and has one to three carbon atoms.

3. The composition of claim 1 wherein r is 1, q is 1, and s is 0.

4. The composition of claim 1 wherein the diioscyanate or polyisocyanate is selected from the group consisting of hexamethylene diisocyanate homopolymer, 3-isocyanatomethyl-3,4,4-trimethylcyclohexyl isocyanate, bis-(4-isocyanatocylohexyl)methane and diisocyanate trimers of formulas (IIa), (IIb):

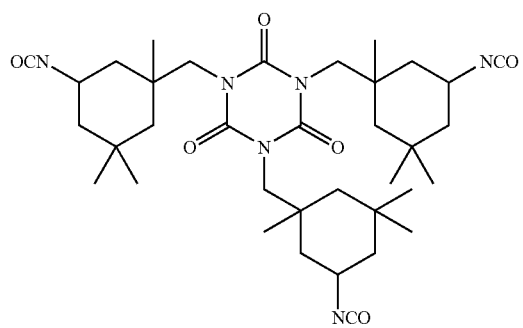

(IIa)

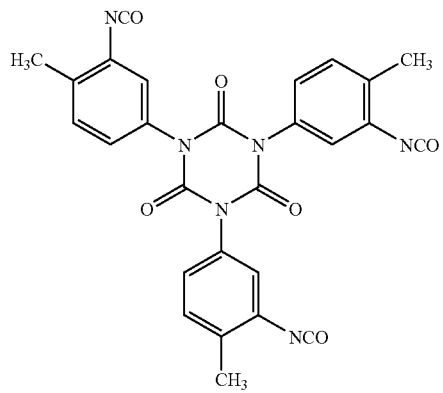

(IIb)

5. The composition of claim 1 wherein step (i) further comprises reacting with a non-fluorinated organic compound of formula

$R^{10}$—$(R^{11})_k$—YH wherein $R^{10}$ is a $C_1$-$C_{18}$ alkyl, a $C_1$-$C_{18}$ omega-alkenyl radical or a $C_1$-$C_{18}$ omega-alkenoyl;

$R^{11}$ is

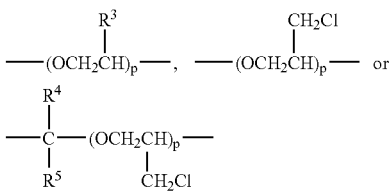

in which $R^3$, $R^4$ and $R^5$ are each independently H or $C_1$ to $C_6$ alkyl, and p is 1 to 50;

k is 0 or 1, and

Y is —O—, —S—, or —N($R^2$)— in which $R^2$ is H or $C_1$ to $C_6$ alkyl.

6. The composition of claim 5 wherein the non-fluorinated organic compound of formula $R^{10}$—$(R^{11})_k$—YH is a water solvatable material comprising at least one hydroxy-terminated polyether of Formula III:

Formula III

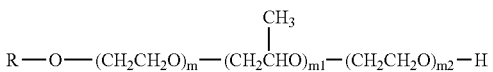

wherein

R is a monovalent hydrocarbon radical containing one to about six aliphatic or alicyclic carbon atoms;

m is a positive integer, and m1 and m2 are each independently a positive integer or zero, said polyether having a weight average molecular weight of a maximum of about 2000.

7. The composition of claim 5 wherein the non-fluorinated compound of reacts with about 0.1 mol % to about 60 mol % of said isocyanate groups.

8. The composition of claim 1 wherein the linking agent is a diamine or polyamine.

9. The composition of claim 1 in the form of an aqueous dispersion.

10. The composition of claim 1 further comprising
A) one or more agents providing at least one surface effect selected from the group consisting of no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, and sun protection, or
B) a surfactant, pH adjuster, cross linker, wetting agent, blocked isocyanate, wax extender, or hydrocarbon extender, or
C) a mixture thereof.

11. The composition of claim 1 further comprising a coating base.

* * * * *